United States Patent
Ragot

(10) Patent No.: US 12,287,206 B2
(45) Date of Patent: Apr. 29, 2025

(54) VIBRATING SENSOR WITH HYBRIDISATION UNIT

(71) Applicant: SAFRAN ELECTRONICS & DEFENSE, Paris (FR)

(72) Inventor: Vincent Ragot, Moissy-Cramayel (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 235 days.

(21) Appl. No.: 18/026,675

(22) PCT Filed: Sep. 14, 2021

(86) PCT No.: PCT/EP2021/075222
§ 371 (c)(1),
(2) Date: Mar. 16, 2023

(87) PCT Pub. No.: WO2022/058303
PCT Pub. Date: Mar. 24, 2022

(65) Prior Publication Data
US 2023/0341227 A1 Oct. 26, 2023

(30) Foreign Application Priority Data
Sep. 17, 2020 (FR) .................................. 2009433

(51) Int. Cl.
G01C 19/5776 (2012.01)
(52) U.S. Cl.
CPC ............... G01C 19/5776 (2013.01)

(58) Field of Classification Search
CPC ............... G01C 19/5776; G01C 19/5691
See application file for complete search history.

(56) References Cited

U.S. PATENT DOCUMENTS

| 10,715,096 B1* | 7/2020 | Kraver ............. H03M 1/1245 |
| 10,749,471 B2* | 8/2020 | Collin .................. H03B 5/32 |
| 2005/0126289 A1* | 6/2005 | Ragot ............. G01C 19/5691 73/504.12 |
| 2010/0063763 A1* | 3/2010 | Rozelle ........... G01C 19/5691 702/92 |

(Continued)

FOREIGN PATENT DOCUMENTS

| CN | 110865580 A | 3/2020 |
| EP | 1541967 A1 | 6/2005 |
| FR | 2932563 A1 | 12/2009 |

*Primary Examiner* — David J Bolduc
(74) *Attorney, Agent, or Firm* — MUNCY, GEISSLER, OLDS & LOWE, P.C.

(57) ABSTRACT

An inertial rotation sensor comprising a vibratory resonator (1) associated with at least two first transducers (2.1) connected to a first electronic processor unit (5) via an electronic multiplexer member (6) in order to operate successively in a motor mode and in a detection mode and in order to supply a first detection signal. The vibratory resonator (1) is associated with at least two second transducers (2.2) that are connected via two load amplifiers (3.1), two anti-aliasing filters (3.2), and two ADCs (3.3) to a second electronic processor unit (4) in order to operate in detection mode and to supply a second detection signal. The sensor includes an electronic hybridizing unit (20) for forming a third detection signal from the first and second detection signals.

9 Claims, 2 Drawing Sheets

(56) References Cited

U.S. PATENT DOCUMENTS

| | | | |
|---|---|---|---|
| 2010/0212424 A1* | 8/2010 | Malvern | G01C 19/5677 73/504.13 |
| 2012/0235726 A1* | 9/2012 | Elsayed | G01C 19/5776 327/299 |
| 2014/0000366 A1* | 1/2014 | Blomqvist | G01C 19/5776 73/504.12 |
| 2015/0122034 A1* | 5/2015 | Maki | H03G 3/3005 73/649 |
| 2016/0003618 A1* | 1/2016 | Boser | G01D 5/243 73/504.12 |
| 2016/0028380 A1* | 1/2016 | Townsend | H03D 1/18 327/172 |
| 2016/0334213 A1* | 11/2016 | DeWall | G01C 19/5776 |
| 2017/0328712 A1* | 11/2017 | Collin | H03M 3/458 |
| 2018/0245946 A1* | 8/2018 | Weinberg | G01C 19/5684 |
| 2019/0129042 A1* | 5/2019 | Yanagisawa | B60G 17/019 |
| 2019/0145773 A1* | 5/2019 | Collin | G01C 19/5776 73/504.12 |
| 2021/0364292 A1* | 11/2021 | Kuisma | G01C 19/5712 |

\* cited by examiner

VIBRATING SENSOR WITH HYBRIDISATION UNIT

The present invention relates to an inertial rotation sensor with a vibratory resonator.

BACKGROUND OF THE INVENTION

A rotation sensor is a device that measures the component of the angular rotation speed vector that is collinear with an axis of the sensor, referred to as its "sensitive" axis.

Inertial rotation sensors are known that comprise a mechanical resonator, such as a bell or beams, which sensor is associated with transducers arranged to maintain the resonator in vibration and to transmit a measurement to a processing unit arranged to generate information, referred to as an "electrical angle", that is supposed to be representative of the speed of rotation to which the sensor is subjected and as projected onto the sensitive axis of the resonator. Nevertheless, the electrical angle is affected by various defects and errors.

Thus, angle bias depends on initial conditions and is eliminated by discrete differentiation when calculating the angular velocity.

By their very nature, the speed bias and the scale factor of the inertial sensor are n periodic functions of the electrical angle. The Fourier coefficients characterizing speed bias and scale factor depend on individual manufacturing defects of inertial sensors. An individual calibration step that is performed in the factory serves to compensate the effects of these defects within the operating temperature range of the inertial sensor, but this operation is imperfect, and furthermore, it has no effect on the variation of parameters that is due to ageing.

The two modes of vibration of the resonator are associated by 2×2 matrices of mass, of stiffness, and of damping, and they present relative anisotropies that are small compared with unity (these anisotropies are said to be of "first order" in the limited-development sense). Nevertheless, in spite of manufacturing defects, these matrices are entirely symmetrical in the mathematical sense of the term. Consequently, the second and zero harmonics of drift are respectively of first order and of second order, such that the zero harmonic drift is naturally very small and very stable.

It is necessary to minimize the errors that are due to the electronics processing the signals coming from the transducers and to preserve the small magnitude of the zero harmonic drift in spite of the asymmetries of the transducers.

Thus, navigation units make use of inertial sensors in such a manner as to minimize both the effect of drift harmonics and the effect of scale factor as much as possible. Nevertheless, the techniques used for this purpose have no effect on the zero harmonic, such that the equipment must necessarily preserve the small magnitude of its drift.

Document EP-A-1 541 967 discloses an inertial rotation sensor comprising a vibratory resonator associated with at least two modally-orthogonal transducers, each formed by at least one pair of electrodes and all connected via a multiplexer member to a common electronic processor unit so that each of the transducers acts in turn:

as a motor under the effect of excitation signals (also referred to as control signals) that are transmitted in succession via a common control branch by the electronic processor unit in order to maintain the resonator in vibration; and as a detector transmitting successive measurement signals via a common detection branch to the electronic processor unit so as to enable the electrical angle to be generated.

Thus, during a control stage, the processing electronics generates excitation signals that are applied in succession to the transducers while they are acting as motors, and during a detection stage, the same processing electronics processes the measurement signals transmitted by all of the transducers while they are acting as detectors. Anisotropy due to the processing is thus eliminated, both when acting as a motor and as a detector, and the performance of the sensor is improved as a result of harmonic drift being minimized.

In that type of sensor using time-shared operation, performance depends on the setup time of the electronics, in which time must be as short as possible compared with the durations of the detection and control stages. This means that the electronics must be selected to have a passband that is large compared with the reciprocal of the duration of detection. This leads to electronic noise being subjected to a high level of aliasing during sampling, which aliasing greatly degrades the signal-to-noise ratio. The technique used to preserve drift accuracy thus entails the trade-off of greatly degraded angle noise. Such degradation is acceptable for navigation applications, but it is penalizing for piloting, and prohibitive for stabilization.

OBJECT OF THE INVENTION

An object of the invention is to provide an inertial rotation sensor having a vibratory resonator that remedies the above-mentioned drawbacks, at least in part.

BRIEF DESCRIPTION OF THE INVENTION

In order to achieve this object, the invention provides an inertial rotation sensor comprising a vibratory resonator associated with at least two first transducers connected to a first electronic processor unit via an electronic multiplexer member in order to operate successively in a motor mode and in a detection mode and in order to supply at least one first detection signal. The vibratory resonator is associated with at least two second transducers that are connected via two load amplifiers and two analog-to-digital converters (ADCs) to a second electronic processor unit in order to operate continuously in detection mode and to supply at least one second detection signal. The sensor includes an electronic hybridizing unit for forming a third detection signal from the first and second detection signals.

The first transducers operate in shared time. Thus, in control mode, the first transducers receive an excitation signal coming from the same processor unit, and in detection mode all of the measurement signals issued by the first transducers are received and processed by the same processor unit: processing anisotropy is eliminated, thereby enabling navigation to be accurate.

In contrast, the second transducers operate continuously, i.e. the second transducers of the inertial sensor are used as detector transducers that are physically separate from the transducers that provide control (which transducers in this example are the first transducers in control mode). The anti-aliasing filter prevents sampling from degrading noise density in the analog signal in the vicinity of the resonant frequency so that angle noise is naturally low. Nevertheless, asymmetries both of the electronic channels and also of the detection transducers degrade the harmonic content of the electrical angle such that the second signal is not suitable for accurate navigation.

The hybridizing unit combines the first and second detection signals in order to supply a third detection signal that can thus benefit from the accuracy of the first detection signal and the low noise of the second detection signal.

In a particular embodiment, the vibratory resonator is bell-shaped, having a plane annular edge carrying at least one electrode extending facing electrodes that are secured to a carrier structure in order to form the first transducers and the second transducers.

Alternatively, in this embodiment;
the sensor comprises two first transducers that are modally orthogonal and two second transducers that are modally orthogonal, each being formed by two pairs of electrodes; or
the sensor comprises four first transducers forming two groups are transducers that are modally orthogonal and four second transducers forming two groups are transducers that are modally orthogonal, each transducer being formed by two pairs of electrodes.

BRIEF DESCRIPTION OF THE DRAWINGS

Other characteristics and advantages of the invention appear on reading the following description of particular, nonlimiting embodiments of the invention in association with the accompanying figures, in which.

DETAILED DESCRIPTION OF THE INVENTION

Figure 1:
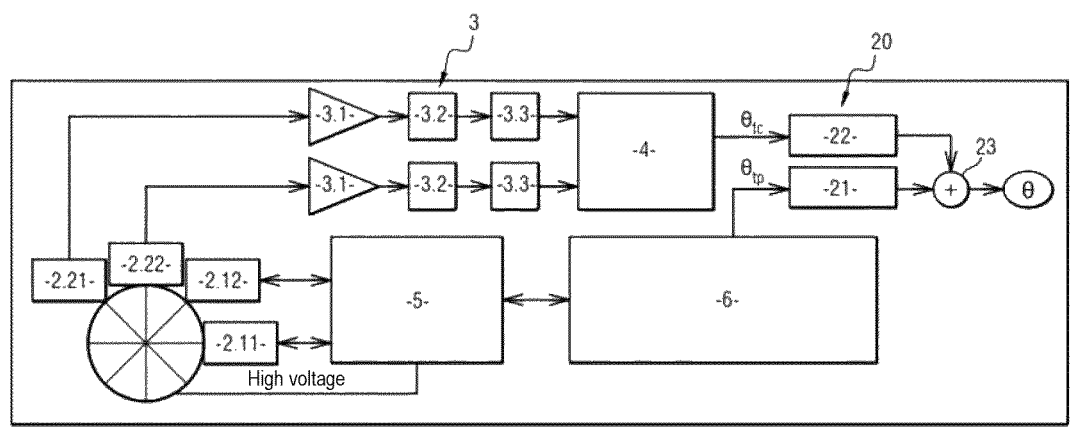
FIG. 1 is a block diagram of a sensor of the invention.
Figure 2:
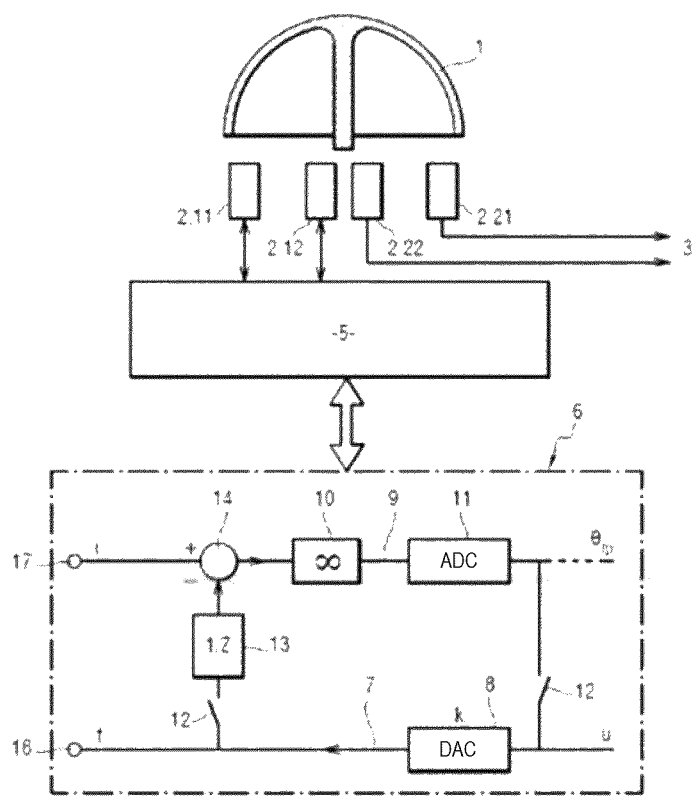
FIG. 2 is a block diagram analogous to that of FIG. 1 showing the time-shared portion of the sensor.

With reference to FIGS. 1 and 2, the inertial rotation sensor of the invention comprises, in conventional manner, a vibratory resonator 1, which is in the form of a bell in this example. The vibratory resonator 1 is associated with the transducers, which in this example are formed by electrodes that are carried by an electrode-carrier structure and that extend facing an annular electrode carried by a plane annular edge of the resonator.

In this example, the transducers comprise first transducers 2.1 (specifically two first transducers referenced 2.11 and 2.12) and second transducers 2.2 (specifically two second transducers referenced 2.21 and 2.22). Each first transducer 2.1 comprises two pairs of electrodes (where a pair is constituted by an electrode on the carrier structure and by the annular electrode; within each pair, the electrodes are facing each other), the pairs being diametrically opposite each other (the two pairs corresponding to one channel), and each second transducer 2.2 comprises two pairs of electrodes (within each pair, the electrodes are facing each other), the pairs being diametrically opposite each other (the two pairs corresponding to one channel). In this example, the transducers 2.1 and 2.2 are uniformly distributed angularly, and the electrodes secured to the carrier structure have the same dimensions. The first transducers 2.11 and 2.12 are modally orthogonal. The second transducers 2.21 and 2.22 are modally orthogonal. The first transducers 2.1 are connected to a first electronic processor unit 6 via a multiplexer stage 5 in order to operate successively in motor mode and in detection mode and in order to supply a first detection signal $\Theta_{tp}$.

The multiplexer stage 5 is an electronic circuit, and it is arranged in conventional manner to subject the annular electrode to a direct current (DC) voltage and to act in alternation:
to demultiplex control signals that are supplied thereto by the processor unit 6 and to transmit them successively to the first transducers 2.1 so as to transform them into motors during a control mode; and
to multiplex measurement signals that are transmitted thereto by each of the first transducers 2.1 while they are in a detection mode and to transmit those signals to the electronic processor unit 6.

The single processor unit 6 is arranged to generate the control signals that are transmitted to the first transducers 2.1 in order to put them into control mode. For this purpose, in the preferred embodiment, the single processor unit 6 comprises a control branch 7 including a digital-to-analog converter (DAC) 8 of gain k that transforms a digital control signal u into an analog control signal f specified by the expression f=ku. The signal f is transmitted via a terminal 16 to the first transducers 2.11 and 2.12 in alternation while they are in control mode (corresponding to a control action time). The processor circuit also includes a detection branch 9 having an input terminal 17 that receives measurement signals from the first transducers 2.11 and 2.12 in alternation while they are in detection mode (corresponding to a detection action time). The input terminal 17 is connected to the summing input of a load amplifier 14 that transforms a current signal i into a voltage signal. The detection branch 9 further includes a corrector member 10 of very high gain, which can be considered as being infinite gain, followed by an ADC 11. The first detection signal $\Theta_{tp}$ is deduced from the output signal of the ADC 11 by a processing algorithm that is itself known. The detection branch 9 is associated with the control branch 7 by switches 12 in order to form a feedback loop that is open during the control action times and closed during the detection action times. The feedback loop also includes a component 13 for dividing by the equivalent impedance of the circuit, which component is connected to the inverting terminal of the load amplifier 14. It can be seen that the gain error and the phase error that are introduced during control by means of the gain k of the converter are thus eliminated during detection, thereby improving the performance of the sensor and minimizing phase error in the quadrature control of the sensor.

The second transducers 2.2 are connected via a preprocessor stage 3 to a second electronic processor unit 4 in order to operate continuously in detection mode and supply a second detection signal $\Theta_{tc}$.

Preferably, the preprocessor stage 3 is an electronic circuit that comprises, for each of the second transducers 2.2, a load amplifier 3.1 having an input connected to the second transducer 2.2, an anti-aliasing filter 3.2 having an input connected to an output of the load amplifier 3.1, and an ADC 3.3 having an input connected to an output of the anti-aliasing filter 3.2 and an output connected to an input of the electronic processor unit 4. Each second transducer 2.2 together with the load amplifier 3.1, the anti-aliasing filter 3.2, and the ADC 3.3 that are connected thereto thus forms a detection circuit. The ADC 3.3 is arranged to have high resolution and a high sampling frequency so that the noise density due to the analog-to-digital conversion is negligible (since the levels of noise that can be tolerated by various different users are not all the same, there is no absolute rule, but very good results can be obtained, for example, with 20 bits and 1 megahertz (MHz)). The anti-aliasing filter 3.2 is arranged to eliminate frequencies greater than half of the sampling frequency so that the noise density of the analog signal in the vicinity of the resonant frequency is not degraded by the sampling. This ensures that the angle noise that is obtained is naturally low.

The electronic processor unit 4 is itself known and is arranged to generate the second detection signal $\Theta_{tc}$ from the signals supplied by the second transducers 2.2.

The sensor includes an electronic hybridizing unit 20 for forming a third detection signal $\Theta$ from the first and second detection signals $\Theta_{tp}$ and $\Theta_{tc}$.

In this example, the electronic hybridizing unit 20 comprises:
- a lowpass filter 21 having an input connected to the first electronic processor unit 6 in order to receive the first detection signal $\Theta_{tp}$ and an output connected to a first input of a summing circuit 23 having an output supplying the third detection signal $\Theta$; and
- a highpass filter 22 having an input connected to the second processor unit 4 in order to receive the second detection signal $\Theta_{tc}$ and an output connected to a second input of the summing circuit 23.

The lowpass filter 21 and the highpass filter 22 have transfer functions that are complementary, i.e. their sum is equal to 1 at all frequencies.

In operation:
- the first transducer 2.11 passes successively through an action time c1 (corresponding to the control mode of the transducer) and through a detection time d1 (corresponding to the detection mode of the transducer) with the changeover from one to the other being controlled by the first electronic processor unit 6;
- the first transducer 2.12 likewise passes successively through an action time c2 and through a detection time d2 with the changeover from one to the other being controlled by the first electronic processor unit 6;
- the second transducers 2.21 and 2.22 operate continuously as detectors, and the second electronic processor unit 4 acts continuously to process the measurement signals that are transmitted thereto by the second transducers 2.2 via the pre-processor stage 3 in order to generate the second detection signal $\Theta_{tc}$; and
- the electronic hybridizing unit generates the third detection signal $\Theta$ from the first and second detection signals $\Theta_{tp}$ and $\Theta_{tc}$.

The third detection signal $\Theta$ thus results from low-frequency re-setting of the second detection signal $\Theta_{tc}$ by the first detection signal $\Theta_{tp}$.

The fact that the sensor includes a single multiplexer stage that associates both of the first transducers to a single processor unit that operates by multiplexing serves not only to eliminate anisotropy between the control circuits and the detection circuits of the first transducers depending on whether they are in control mode or detection mode, but also to eliminate crosstalk between control and detection for each of the first transducers, such that the performance of the sensor is further improved.

It should be observed that the invention can be applied to existing inertial sensors, providing the number of transducers is sufficient to form one group operating as detectors on a continuous basis and another group alternating between acting as detectors and as motors.

Figure 3:
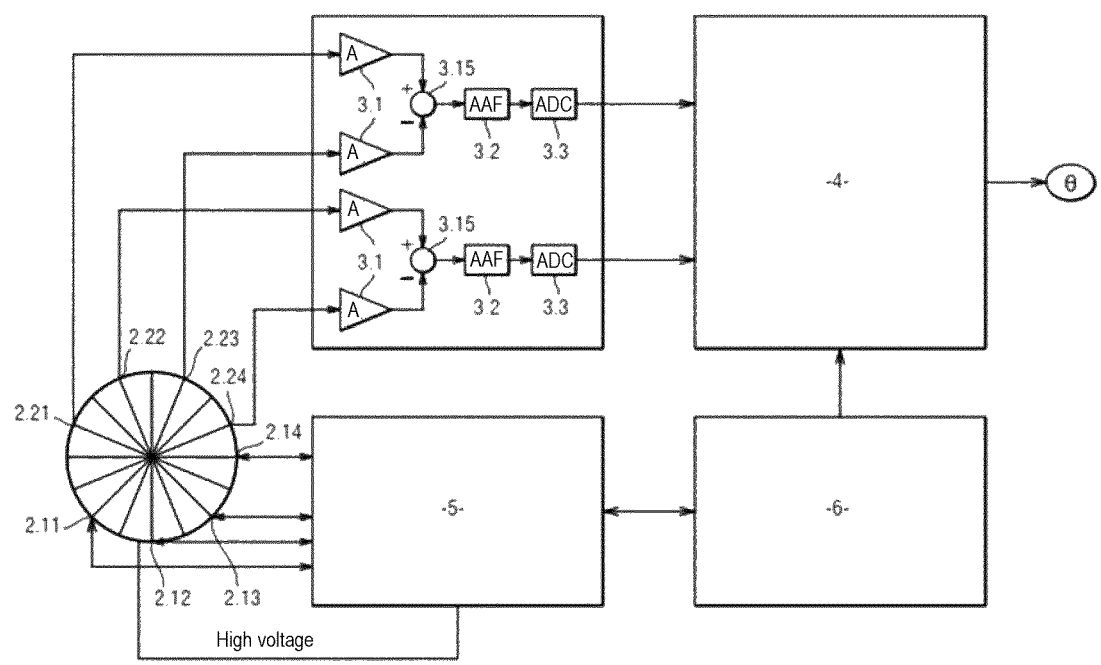
FIG. 3 is a block diagram of a variant sensor of the invention.

The sensor in the variant of FIG. 3 differs from the above described sensor in that it has sixteen electrodes secured to the electrode-carrier structure instead of eight electrodes.

In this example, the transducers comprise four first transducers 2.1 (referenced 2.11 to 2.14) and four second transducers 2.2 (referenced 2.21 to 2.24). Each first transducer 2.1 comprises two electrode pairs (i.e. one electrode on the carrier structure and the annular electrode; and within each pair the electrodes face each other), the pairs being diametrically opposite each other (with the two pairs corresponding to one channel). Each second transducer 2.2 comprises two pairs of electrodes (within each pair the electrodes face each other), the pairs being diametrically opposite each other (with the two pairs corresponding to one channel). In this example, the transducers 2.1 and 2.2 are uniformly distributed angularly, and the electrodes secured to the carrier structure all have the same dimensions. The groups of first transducers (2.11, 2.13) and (2.12, 2.14) are modally orthogonal. The groups of second transducers (2.21, 2.23) and (2.22, 2.24) are modally orthogonal.

Each of the second transducers 2.21, 2.23 that are physically orthogonal to each other is connected to a respective amplifier 3.1, one having its output connected to the positive input of a summing circuit 3.15 and the other one having its output connected to the negative input of the same summing circuit 3.15. Each of the second transducers 2.22, 2.24 that are physically orthogonal to each other is connected to a respective amplifier 3.1, one having its output connected to the positive input of a summing circuit 3.15 and the other one having its output connected to the negative input of the same summing circuit 3.15. Each summing circuit 3.15 has an output connected to an anti-aliasing filter 3.2 that is connected as above to a respective ADC 3.3 that is connected to the electronic processor unit 4.

This solution is very advantageous. Specifically, this arrangement serves to further reduce the effect of vibration due to the operating environment. With the solutions having eight or sixteen electrodes, bending movements of the bell about its stand gave rise to opposite variations of capacitance on electrodes that are diametrically opposite, and these variations are rejected by connecting said electrodes in parallel. Also, in the embodiment having sixteen electrodes, movements in translation of the bell relative to the electrode-carrier structure are rejected by differential processing between the pairs of electrodes that are physically orthogonal to each other.

In this sixteen-electrode embodiment, the hybridizing algorithm generates $\Theta$ while taking account of the fact that the electrical angles $\Theta_{tp}$ and $\Theta_{tc}$ are offset by 45°.

Naturally, the invention is not limited to the embodiments described, and it is possible to apply embodiment variations thereto without going beyond the ambit of the invention as defined by the claims.

In particular, the structure of the sensor of the invention could be different from that described.

The regulator could be of some other shape, and for example it could comprise mutually parallel vibratory beams as in the sensors sold under the "Quapason" trademark by the supplier SAFRAN ELECTRONICS & DEFENSE or to so-called DELCO angular sensors (e.g. with a configuration having eight pairs of electrodes). The sensor could equally well be of the micro-electromechanical systems (MEMS) type as covered by patent FR-A-2 983 574. Whatever the type of resonator, with shared time, it is preferable to make sequential use the following:
- a single electronic channel for both of the vibration mode axes of the resonator, which axes are offset from each other by 45° in a bell type resonator and by 90° in a parallel beam resonator of QUAPASON type and also in a resonator as covered by patent FR-A-2 983 574; and
- respective single groups of transducers acting as actuators and then as detectors for each of these two axes.

The electronic processing and hybridizing units may be of structures that are different from those described.

The electronic processing and hybridizing units they form parts of a common electronic circuit or of electronic circuits that are distinct.

The principle of hybridizing by means of complementary filters as described above is the simplest, but it is naturally possible to envisage hybridizing in other ways, e.g. such as hybridizing by means of Kalman filtering.

The anti-aliasing filters are optional.

In a variant, it should be observed that it is advantageous to make use of a greater number of electrodes in order to benefit from differential effects suitable for reducing certain errors, e.g. in order to reject the effects of linear accelerations.

The transducers may be arranged in a distribution that is not angularly uniform.

The electrodes may be of different sizes. In particular, the electrodes of the second transducers may be of area greater than the electrodes of the first transducers.

The transducers may be capacitive, piezoelectric, . . . .

In a variant, after analog-to-digital conversion, each first transducer delivers a first detection signal, and after analog-to-digital conversion, each second transducer delivers a second detection signal, and the electronic hybridizing unit uses the first and second detection signals to form the third detection signal.

The transducers need not be modally orthogonal.

The invention claimed is:

1. An inertial rotation sensor comprising a vibratory resonator associated with at least two first transducers connected to a first electronic processor unit via an electronic multiplexer member in order to operate successively in a motor mode and in a detection mode and in order to supply at least one first detection signal, the sensor being characterized in that the vibratory resonator is associated with at least two second transducers that are connected via two load amplifiers and two ADCs to a second electronic processor unit in order to operate continuously in detection mode and to supply at least one second detection signal, and in that the sensor includes an electronic hybridizing unit for forming a third detection signal from the first and second detection signals.

2. The sensor according to claim 1, wherein the electronic hybridizing unit comprises:

- a lowpass filter having an input connected to the first processor unit in order to receive the first detection signal and an output connected to a first input of a summing circuit having an output supplying the third detection signal; and
- a highpass filter having an input connected to the second processor unit in order to receive the second detection signal and an output connected to a second input of the summing circuit.

3. The sensor according to claim 2, wherein the lowpass filter and the highpass filter have transfer functions that are complementary.

4. The sensor according to claim 1, wherein each first transducer comprises two pairs of electrodes facing each other, the pairs being diametrically opposite from each other, and each a second transducer comprises two pairs of electrodes facing each other, the pairs being diametrically opposite each other.

5. The sensor according to claim 1, wherein the two second transducers are connected to the second electronic processor unit via the two load amplifiers, via two anti-aliasing filters, and via the two ADCs.

6. The sensor according to claim 1, wherein the vibratory resonator is bell-shaped, having a plane annular edge carrying at least one electrode extending facing electrodes that are secured to a carrier structure in order to form the first transducers and the second transducers.

7. The sensor according to claim 6, comprising two first transducers that are modally orthogonal and two second transducers that are modally orthogonal, each being formed by two pairs of electrodes.

8. The sensor according to claim 6, comprising four first transducers forming two groups are transducers that are modally orthogonal and four second transducers forming two groups are transducers that are modally orthogonal, each transducer being formed by two pairs of electrodes.

9. The sensor according to claim 1, wherein after analog-to-digital conversion, each first transducer delivers a first detection signal, and after analog-to-digital-to-digital conversion, each second transducer delivers a second detection signal, and the electronic hybridizing unit uses the first and second detection signals to form the third detection signal.

* * * * *